US007527084B2

(12) United States Patent
Kaczkowski

(10) Patent No.: US 7,527,084 B2
(45) Date of Patent: May 5, 2009

(54) APPARATUS AND PROCESS FOR PLACEMENT OF SEALING ADHESIVES ON CONTAINERS

(76) Inventor: Krzysztof Kaczkowski, 1317 Logan Cir., NW., Atlanta, GA (US) 30318

( * ) Notice: Subject to any disclaimer, the term of this patent is extended or adjusted under 35 U.S.C. 154(b) by 660 days.

(21) Appl. No.: 11/201,012

(22) Filed: Aug. 10, 2005

(65) Prior Publication Data

US 2007/0034340 A1 Feb. 15, 2007

Related U.S. Application Data

(60) Provisional application No. 60/602,694, filed on Aug. 19, 2004.

(51) Int. Cl.

*B29C 65/00* (2006.01)
*B32B 37/00* (2006.01)
*B32B 38/04* (2006.01)
*B32B 38/10* (2006.01)
*B65C 11/04* (2006.01)

(52) U.S. Cl. ....................... 156/510; 156/521; 156/531; 156/578

(58) Field of Classification Search ................. 156/510, 156/521, 531, 578
See application file for complete search history.

(56) References Cited

U.S. PATENT DOCUMENTS

| | | | | |
|---|---|---|---|---|
| 2,250,236 | A * | 7/1941 | Bennett | 225/7 |
| 3,057,218 | A * | 10/1962 | Knerr et al. | 474/2 |
| 3,269,278 | A * | 8/1966 | Olstad | 493/197 |
| 3,853,280 | A * | 12/1974 | Pennisi et al. | 242/530.3 |
| 3,955,481 | A * | 5/1976 | Heitmann | 493/8 |
| 4,875,632 | A * | 10/1989 | Kataoka | 242/530 |
| 5,228,635 | A * | 7/1993 | Tanaka et al. | 242/413.3 |
| 6,276,421 | B1 * | 8/2001 | Valenti et al. | 156/521 |

* cited by examiner

*Primary Examiner*—Philip C Tucker
*Assistant Examiner*—Michael N Orlando
(74) *Attorney, Agent, or Firm*—Harry I. Leon; Vivian L. Steadman

(57) ABSTRACT

An apparatus for affixing glue strips to both the top and bottom sides of folded, yet-to-be assembled cardboard containers. The apparatus, which is loaded prior to use with a wide roll of release coated paper, slices it into two strips. Each strip is then cut into many short strips of the desired length and glue applied to these short strips just prior to their being placed on folded containers. The release coated paper than forms a protective cover for the glue until the containers are used. The use of the release coated paper not only is much cheaper than pre-glued paper but also eliminates problems associated with storing and handling narrow pre-glued paper strips.

7 Claims, 4 Drawing Sheets

APPARATUS AND PROCESS FOR PLACEMENT OF SEALING ADHESIVES ON CONTAINERS

CROSS REFERENCE TO RELATED APPLICATION

The subject matter of this application was disclosed in U.S. Provisional Patent Application Ser. No. 60/602,694, filed Aug. 19, 2004.

BACKGROUND OF THE INVENTION

Any placement of pre-glued paper strips on yet-to be assembled, foldable cardboard containers with the use of sealing machines faces a major obstacle: in storage the disks holding the pre-glued paper tend to warp making it unsuitable for such application. Further, pre-glue paper rolls are much more expensive to use than is a release paper to which glue is applied just prior to placement on the containers. Nor is placement of glue directly on a cardboard carton an ideal method for sealing it. The rough surface of cardboard leads to a glue layer which is non-uniform and of varying thickness. In addition, there is a need to protect the surface of the glue by immediately placing a layer of release paper on it.

SUMMARY OF THE INVENTION

The object of this invention is to provide an apparatus and method to facilitate faster, more accurate placement of glue strips on foldable cardboard containers, prior to their assembly, and to achieve this placement at a lower material cost as well as with a reduction in material waste and less expenditure of supervision time. A further object is to provide such an apparatus which allows for a wide variation in length and width of the glue strips being placed.

In the improved method, glue is applied onto strips of release coated paper moments before they are attached to the containers. Individual paper strips and containers move through the machine simultaneously. Each paper strip not only acts to transfer the glue to one of the containers, but also serves as a protective strip which can be removed by the user when the container is filled and ready to seal. Fabricated from a single roll of release coated paper, the strips are preferably mounted in pairs since the containers usually must be sealed on both the top and the bottom. In the prototype, as many as 120 pairs of glue-coated paper strips per minute have been mounted on the containers as the containers pass through the machine.

In the improved apparatus, the single roll of release coated paper is sliced into two strips which makes the length of each strip in the pair identical, thereby eliminating the waste of a partial roll in production. This approach also allows the operator to refill only one roll rather than two rolls. It should be noted that the slicing of release paper is much easier and eliminates the difficult problems involved in slicing pre-glued paper strips. This feature alone reduces operational cost by an estimated 25 percent.

The apparatus comprises two heads which are mirror images of each other. One of the heads is used for applying the glue to the top of the container and the other to the bottom. The heads are slideably mounted on a common frame in such a manner that the distance between the heads can readily adjusted so that the apparatus can accommodate variation in the size of the containers to be sealed. The heads are virtually identical; for convenience only one of the heads needs to be discussed.

Each head comprises means for receiving the free end of one of the release coated paper strips and then driving it through the apparatus. The output of each head is a series of relatively short paper strips of a given length to which swaths of glue have been affixed which are then applied directly to the folded cardboard containers as they pass through the apparatus. The length of these individual glue strips can vary widely: ranging from 2 inches and upward, virtually without limit. To facilitate removing the release strips when the containers are ready to be put into use, the head can also produce a series of release coated paper strips which are longer than the glue swaths affixed thereto, so that the ends of the paper strips are free of glue.

In operation, the apparatus attaches the glue-bearing paper strips to the folded cardboard containers in a series of quick starting and stopping movements of short duration. Likewise, the paper strips, as they move through the apparatus, are subjected to a series of short jerks as each strip is momentarily stopped at the instant of its being cut to the desired length. Two elements of the apparatus which are employed to reduce the stress on each paper strip during these quick stopping and starting movements include a slack forming chamber which maintains a controlled slack in the paper feed and a stress reduction clutch.

DETAILED DESCRIPTION OF THE PREFERRED EMBODIMENT

Figure 1:
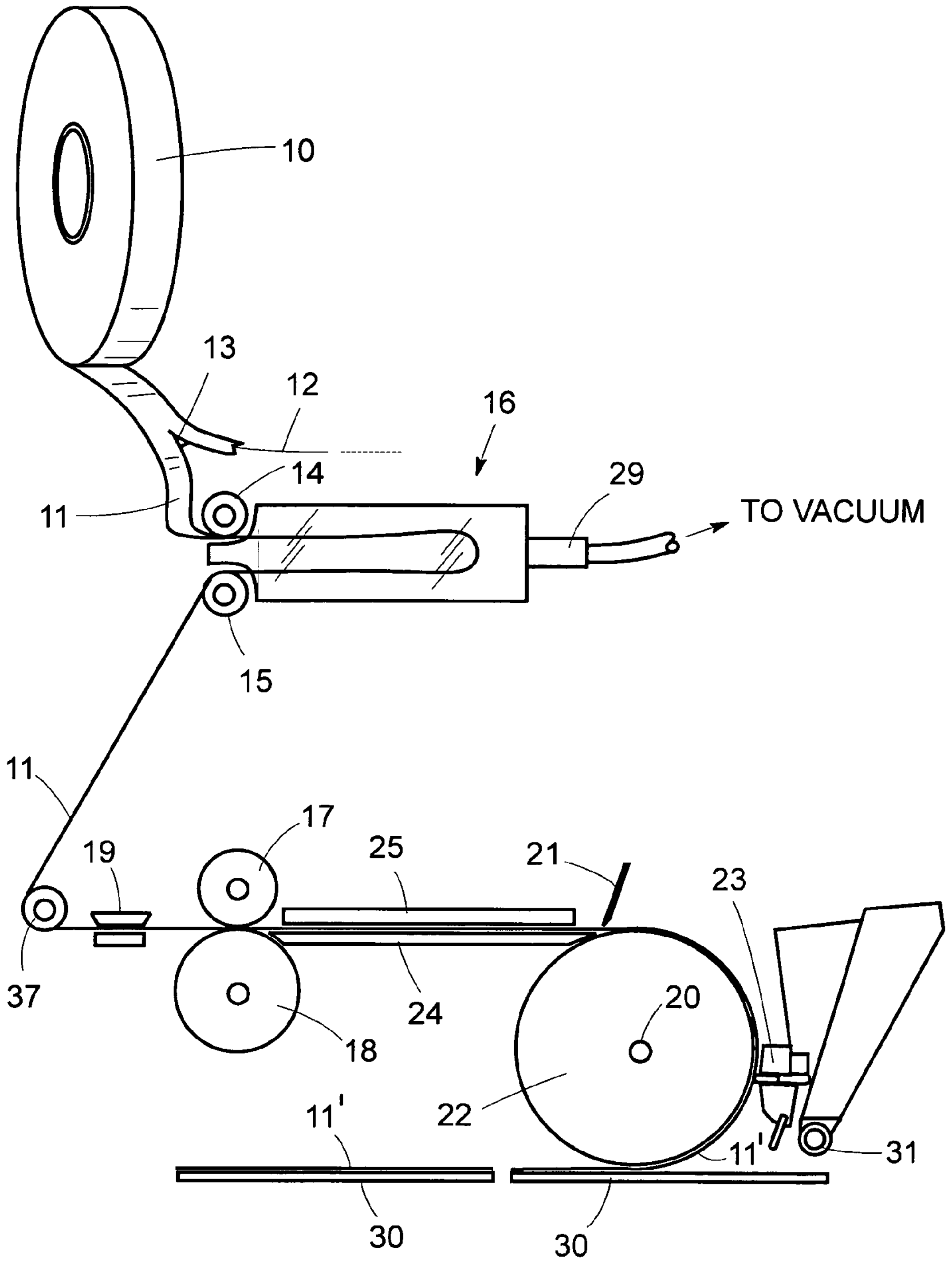
FIG. 1 is a schematic diagram showing the basic elements of the apparatus according to the present invention.
Figure 2:
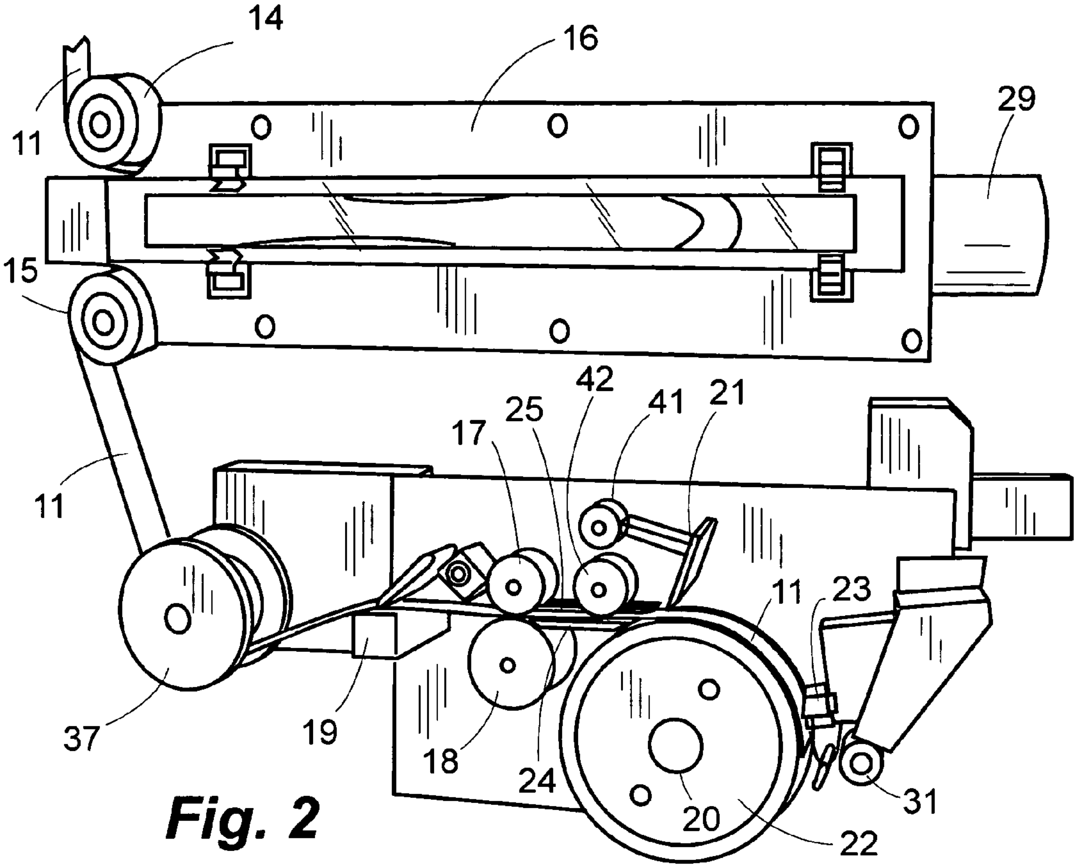
FIG. 2 is a perspective view of one of the dispensing heads of the apparatus.

The apparatus comprises elements shown schematically in FIG. 1. A typical roll of release coated paper 10, which measures, by way of example, 3 ½ inches wide and 15,000 feet long, is mounted on the apparatus (FIG. 1). In the first operational step, the paper 10 is cut into two strips 11 and 12 by a slitter 13. One of these strips is then used to seal the top of a folded cardboard container 30, while the other is attached to the bottom of the folded cardboard container. For ease of discussion, the preparation of only one strip is described herein, since the procedure for preparing the other strip (strip 12 in this case) is the mirror image.

Figure 3:
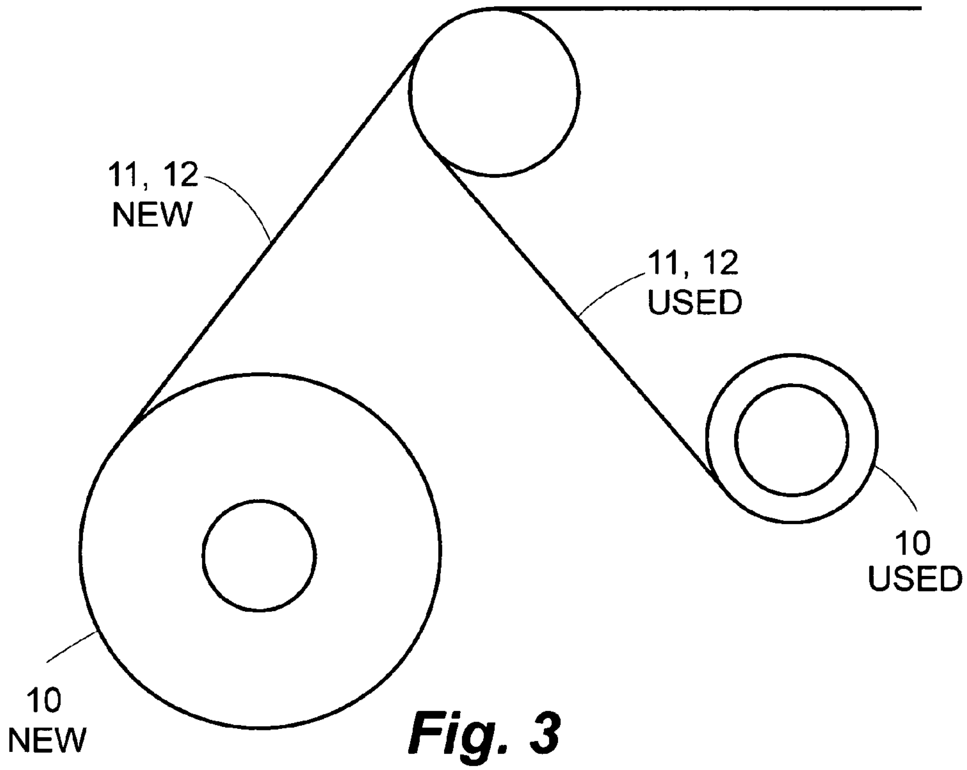
FIG. 3 is a schematic diagram of a splicing operation in which a new roll of release paper is spliced onto a used roll of release paper in the apparatus according to FIG. 1.
Figure 4:
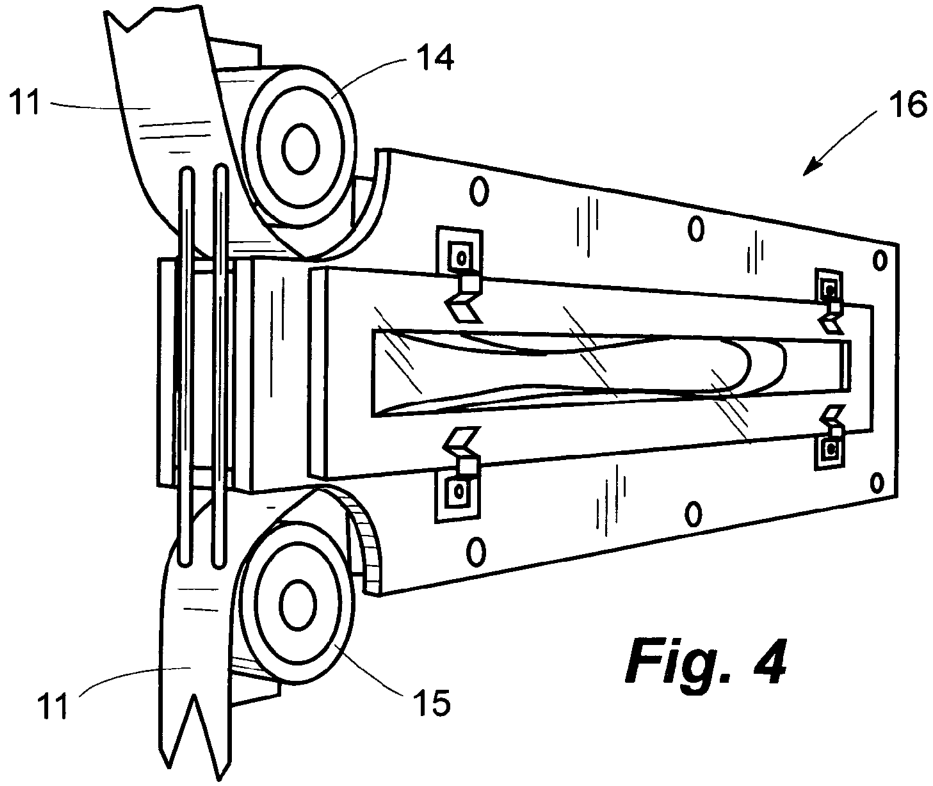
FIG. 4 is a perspective view of the slack forming chamber in the apparatus according to FIG. 1.

Previously, it was common practice to use two rolls of pre-glued, release coated paper (PGRC) such as that produced by 3M and Ludlow. Splitting the paper according to the present invention avoids the problems of deformation of the rolls during storage, since the wider roll, without glue does not deform during storage. Moreover, the use of plain paper represents a saving of 50 to 70 percent in cost over that of pre-glued paper. Further, it saves on waste since the paper length for both strips is then identical and there is never any need to waste a partial roll when one roll is depleted. Also having one source for both strips and an identical length for the individual strips allows for automatic splicing of new rolls as shown schematically in FIG. 3.

The paper used for this improved process preferably is a release coated material which is only 2.3 mil thick, such as that manufactured by Ludlow. The paper comes in rolls which are 15,000 feet long—a length of roll which lends itself to reduced machine downtime. Moreover, this release coated paper costs about one fourth that of PGRC paper per roll; and the roll is nearly 10 times as long.

The apparatus includes several unique features to help keep the paper 11, 12 from tearing during the operation. The preferred paper has a tensile strength of 30 pounds per inch width or 52.5 pounds for the 1 ¾ inch width strip, and it must be handled with care to avoid tearing during the process of making the glue-coated strips. Two stress reducing elements have been incorporated into the apparatus; these elements include a slack forming chamber and an inertia reducing clutch for one of the drive pulleys.

Figure 5:
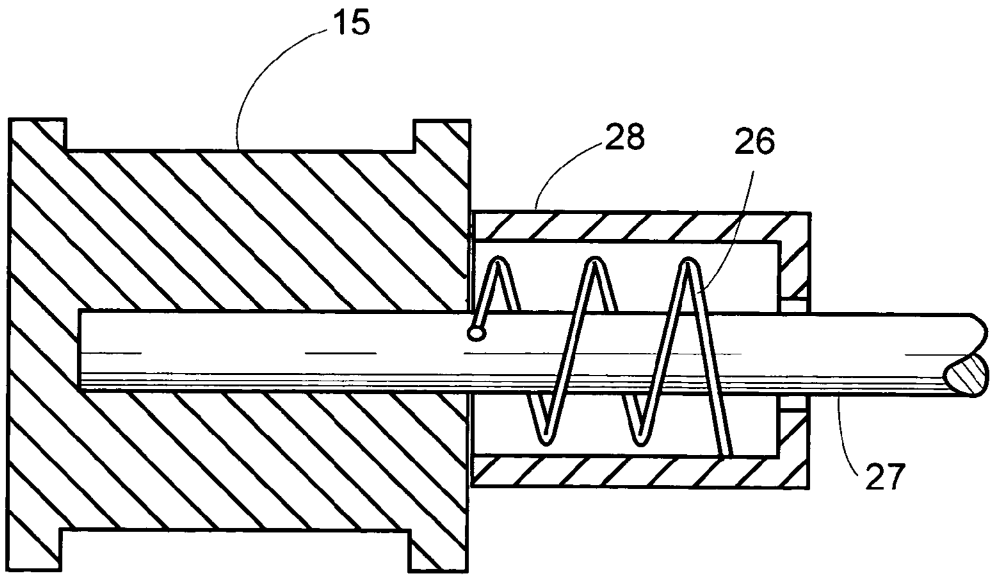
FIG. 5 is a view partly in cross-section of a fragmentary portion of the torsion spring clutch in the apparatus according to FIG. 1.
Figure 6:
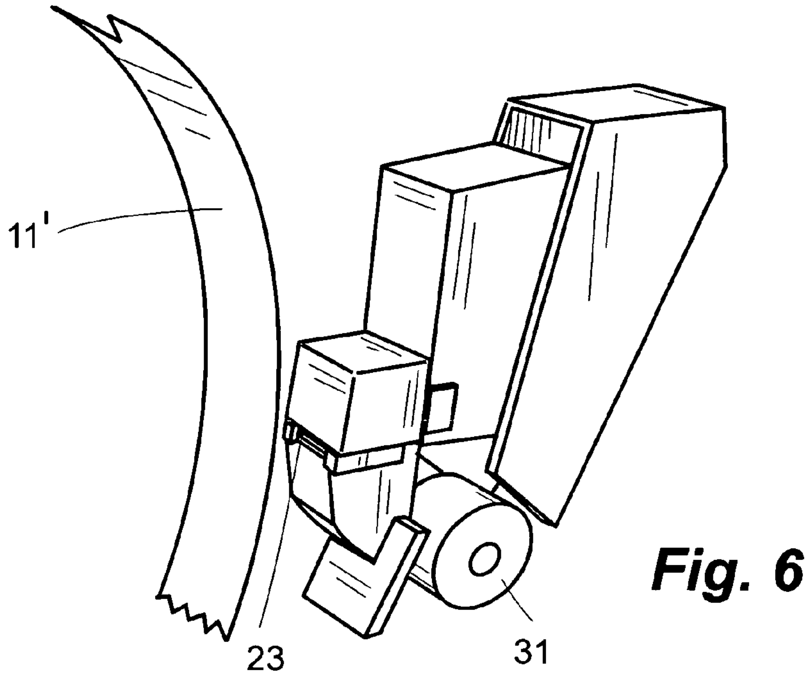
FIG. 6 is a perspective view of the glue injector in the apparatus according to FIG. 1.
Figure 7:
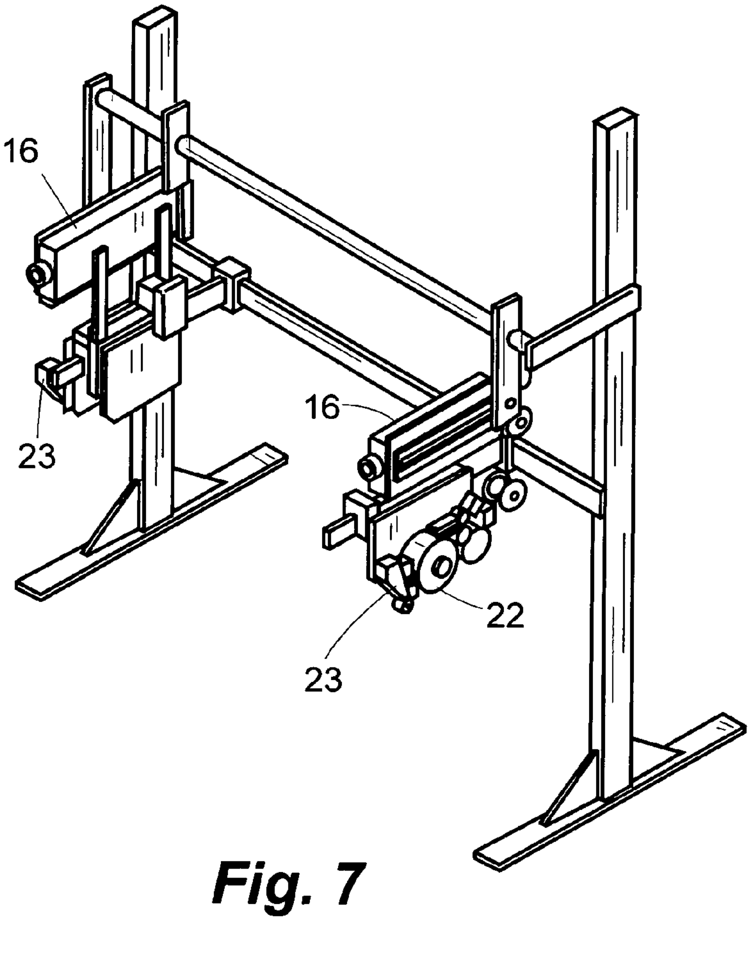
FIG. 7 is a perspective drawing showing how the working heads of the apparatus according to FIG. 1 are adjustably mounted on its frame.

After the splitter 13, the paper strip 11 is fed over roller 14 into the slack forming chamber 16. In this chamber 16, a slack loop is allowed to form and be gently tensioned by the use of a vacuum source 29 (which can be applied by a shop type vacuum cleaner). The paper strip 11 leaves the chamber 16 by the roller 15. As shown in FIG. 5, a clutch designed for the pulley 15 comprises a plastic case 28 in friction contact with the side face of the pulley 15. A torsion spring 26 is attached on one end to the shaft 27 and on the other end to the plastic case 28. On starting rotation, the torsion spring on the pulley allows a slight slippage as it winds the spring 26. This slippage reduces the initial shock of the load on the strip 11. When the pulley 15 suddenly stops, the spring 26 tends to push the pulley 15 in a direction opposite to its rotation, thereby acting as a brake and again reducing the strain on the strip 11.

When the strip 11 passes over the pulley 15, it is then fed through the guide 24, 25 by the use of two rollers 17, 18. Driven roller 18 is made of metal with rubber insert and roller 17 has a rubber surface in contact with the strip 11. Thus both rollers 17, 18 push the strip 11 between guide plate 24 and guide bars 25 where the strip is flattened as it moves under a knife 21. Moving in an arc as it is being held by a wheel 41, the knife 21 then drops down at an oblique angle to the advancing strip 11 and cuts the strip to the desired length. (The knife 21 follows a path which forms an approximate tangent to the final drive pulley wheel 22.) The edge of the knife blade 21 is serrated in order to lower stress on the strip 11. The length of the cut strip 11' can be varied between 2 inches to continuous according to the needs of a particular, application. As the knife blade 21 cuts the strip 11, the brake 19 momentarily stops the strip 11; and the wheel 42 holds the strip 11 on the guide plate and bars 24, 25. Each cut strip 11' then moves onto the wheel 22 where it is held on this wheel by a vacuum pulling on the strip 11' through multiple small holes in the outer surface of the wheel, the inner chamber of the wheel 22 being fed intermittently by the vacuum source 29 which is connected to the center 20 of the wheel 22. While the strip 11' is on the outer surface of the wheel 22, glue is applied to the strip 11' by a glue injector 23, pivotally mounted on a shaft 31. The glue injector 23 includes a nozzle which intermittently makes contact with the cut strips 11' while glue is being applied. In the prototype, glue can be applied up to 0.009 in thickness. After each of the strips 11' has had a substantial part of its outer surface covered with glue, the wheel 22 guides and presses the cut strip 11' onto the folded cardboard container 30 which is being fed simultaneously into the apparatus at the same surface speed as the perimeter of the wheel 22. This matching of speed allows for accurage placement of the coated glue strip 11' on the surface of the container 30. In the prototype, the strips 11' were applied at a rate of up to 500 feet per minute; and as many as 120 pairs of glue-coated strips 11' per minute have been attached to the containers 30 as they passed through the apparatus.

The apparatus also comprises a control that allows the length of the glue strips to vary from 2 inches to virtually infinite length.

What is claimed:

1. A machine for placing glue strips on folded cardboard containers as the containers travel through the machine, the machine being fed by at least one roll of release coated paper during use, comprising:

(a) means for slicing the wide roll of paper into at least two narrower strips of paper;

(b) means, including an initial drive pulley and an inertia reducing clutch, for handling each strip of paper as it is being fed through the machine in such a manner as to reduce the stress on the strip, the means for handling each strip of paper further including an elongated chamber in which an elongated loop of the strip is tensioned by a vacuum; the initial drive pulley, when energized, pulling the strip from the elongated chamber; the clutch having a torsion spring attached to the shaft of the initial drive pulley, so that on starting rotation the torsion spring acting on the pulley allows a slight slippage as it winds the spring, this slippage reducing the initial shock of the load on the strip, and when the pulley suddenly stops, the spring tending to push the pulley in a direction opposite to its rotation, again reducing strain on the strip;

(c) means for cutting individual segments of a desired length from one end of each strip; and (d) an injector for putting a layer of glue on each segment just prior to its placement on one of the folded cardboard containers.

2. The machine according to claim 1 wherein the means for cutting individual segments comprises a knife blade which drops on the strip proximate its terminal edge, the machine further including a final drive pulley wheel and means for flattening the strip as it moves under the knife blade, the knife blade dropping down at an oblique angle to the longitudinal centerline of the strip as it advances towards the wheel and cutting the strip at said angle, the knife blade having a serrated edge in order to lower stress on the strip.

3. The machine according to claim 1 wherein the injector comprises a nozzle which is pivotally mounted and which makes intermittent contact with each segment and which further comprises means for controlling the contact time so that the placement and length of the glue layer can be varied.

4. The machine according to claim 1 which further comprises a final drive pulley wheel and means for holding each segment on the outer periphery of the wheel while the glue injector makes intermittent contact with the segment.

5. The machine according to claim 4 wherein the glue injector includes a glue nozzle which makes contact with the segment while the segment is disposed downwardly of the center of the wheel, the glue nozzle applying the glue layer to the segment starting near its leading edge and then moving away from the segment as the trailing edge of the segment approaches the nozzle.

6. The machine according to claim 4 which further comprises means, including the wheel, for placing the segment on one of the cardboard containers as the container passes in contact with the wheel.

7. A machine for placing glue strips on folded cardboard containers as the containers travel through the machine, the machine being fed by at least one wide roll of release coated paper during use, comprising:

(a) means for slicing the release coated paper;

(b) means, including an initial drive pulley and an inertia reducing clutch, for handling each strip of paper as it is being fed through the machine in such a manner as to reduce the stress on the strip, the handling means including an elongated chamber in which an elongated loop of the strip is gently tensioned by a vacuum;

(c) a final drive pulley wheel;

(d) means, including a knife blade, for cutting individual segments of a desired length from one end of the strip, the knife blade dropping down at an obligue angle to the longitudinal centerline of of the strip as it approaches the outer periphery of the wheel and cutting the strip at said angle, the knife having a blade with a serrated edge in order to lower the stress on the strip;

(e) means, including a brake, for momentarily stopping the strip each time it is cut by the knife blade, the brake stopping the strip at the instant of the strip's being so cut;

(f) means for applying a layer of glue to each segment, the glue applying means including a glue nozzle;

(g) means, including a vacuum source, for holding each segment on the outer periphery of the drive pulley wheel while the glue nozzle makes intermittent contact with the segment; and (h) the initial drive pulley, when energized, pulling the strip from the elongated chamber; the clutch having a torsion spring attached to the shaft of the initial drive pulley, so that on starting rotation the torsion spring acting on the pulley allows a slight slippage as it winds the spring, this slippage reducing the initial shock of the load on the strip, and when the pulley suddenly stops, the spring tending to push the pulley in a direction opposite to its rotation, again reducing strain on the strip.

* * * * *